US010065246B2

(12) United States Patent
Coakley

(10) Patent No.: US 10,065,246 B2
(45) Date of Patent: Sep. 4, 2018

(54) LASER LINE GENERATOR TOOL FOR A PIPE MACHINING APPARATUS

(71) Applicant: Illinois Tool Works Inc., Glenview, IL (US)

(72) Inventor: Roy C. Coakley, Northlake, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 46 days.

(21) Appl. No.: 15/046,539

(22) Filed: Feb. 18, 2016

(65) Prior Publication Data

US 2016/0297009 A1 Oct. 13, 2016

Related U.S. Application Data

(60) Provisional application No. 62/146,640, filed on Apr. 13, 2015.

(51) Int. Cl.
| | |
|---|---|
| *B23B 25/06* | (2006.01) |
| *B23B 5/16* | (2006.01) |
| *B23D 21/04* | (2006.01) |
| *B23Q 17/24* | (2006.01) |
| *B23B 3/26* | (2006.01) |

(52) U.S. Cl.
CPC .............. *B23B 25/06* (2013.01); *B23B 3/265* (2013.01); *B23B 5/163* (2013.01); *B23D 21/04* (2013.01); *B23Q 17/24* (2013.01); *B23B 2215/72* (2013.01); *B23B 2260/092* (2013.01)

(58) Field of Classification Search
CPC ... B23B 5/163; B23B 25/06; B23B 2260/092; B23D 21/04; B23Q 17/2419; B23Q 17/2414

See application file for complete search history.

(56) References Cited

U.S. PATENT DOCUMENTS

| 1,140,208 A | 5/1915 | Taylor |
|---|---|---|
| 1,225,209 A | 5/1917 | Beaulieu |

(Continued)

FOREIGN PATENT DOCUMENTS

| CN | 85102879 A | 1/1986 |
|---|---|---|
| CN | 87101953 A | 9/1988 |
| CN | 2109276 U | 7/1992 |
| CN | 2126125 U | 12/1992 |
| CN | 2475496 Y | 2/2002 |
| CN | 1562545 A | 1/2005 |

(Continued)

OTHER PUBLICATIONS

International Search Report and Written Opinion for PCT/US2013/062999 dated Jan. 29, 2014, 12 pages.

(Continued)

*Primary Examiner* — Alan Snyder
(74) *Attorney, Agent, or Firm* — Klintworth & Rozenblat IP LLP

(57) ABSTRACT

A pipe machining apparatus according to an aspect includes a frame capable of being mounted onto a pipe, a tool carrier coupled to and movable relative to the frame, a tool support coupled to and movable with the tool carrier relative to the frame, and a laser line generator tool mounted on and movable with the tool support. The laser line generator tool is used to image a laser light onto the pipe to align with a mark(s) on the pipe which denotes a proper cut line around the pipe. The apparatus can be repositioned relative to the pipe in order to enable an operator to properly position the apparatus on the pipe prior to a cutting operation.

7 Claims, 7 Drawing Sheets

(56) References Cited

U.S. PATENT DOCUMENTS

| | | | |
|---|---|---|---|
| 1,323,092 A | 11/1919 | Palmer |
| 2,275,327 A | 3/1942 | Severson |
| 2,358,741 A | 9/1944 | Shelby |
| 2,364,963 A | 12/1944 | Elliott |
| 2,635,270 A | 4/1953 | Dawson |
| 2,798,390 A | 7/1957 | Bennett |
| 2,842,238 A | 7/1958 | Shaw |
| 2,931,659 A | 4/1960 | Novkov |
| 3,078,547 A | 2/1963 | Sweet |
| 3,371,567 A | 3/1968 | Davis |
| 3,455,002 A | 7/1969 | Miller |
| 3,732,618 A | 5/1973 | Lorenz |
| 3,732,758 A | 5/1973 | Rinaldo |
| 3,807,047 A | 4/1974 | Sherer |
| 3,893,356 A | 7/1975 | Atzberger |
| 3,908,491 A | 9/1975 | Gilmore |
| 3,942,248 A | 3/1976 | Sherer |
| 4,104,937 A | 8/1978 | Breaux |
| 4,111,083 A | 9/1978 | Carter |
| 4,112,794 A | 9/1978 | Franks |
| 4,114,484 A | 9/1978 | Feamster, III |
| 4,211,510 A | 7/1980 | Hopkins |
| 4,217,061 A | 8/1980 | Eiland |
| 4,318,391 A | 3/1982 | Wachs et al. |
| 4,366,994 A | 1/1983 | Yoshioka |
| 4,391,458 A | 7/1983 | Blakeley |
| 4,397,487 A | 8/1983 | Guttman |
| 4,402,136 A | 9/1983 | Rast |
| 4,411,178 A | 10/1983 | Wachs |
| 4,421,441 A | 12/1983 | Hirose |
| 4,483,223 A | 11/1984 | Nall et al. |
| 4,490,909 A | 1/1985 | Wachs et al. |
| 4,493,150 A | 1/1985 | Garcia |
| 4,543,861 A | 10/1985 | Kwech et al. |
| 4,608,755 A | 9/1986 | Braasch |
| 4,637,285 A | 1/1987 | Mizoguchi |
| 4,640,159 A | 2/1987 | Stojanovski |
| 4,655,108 A | 4/1987 | Galos |
| 4,677,884 A | 7/1987 | Kwech et al. |
| 4,739,685 A | 4/1988 | Ricci |
| 4,750,392 A | 6/1988 | Hong |
| 4,762,038 A | 8/1988 | Olson |
| 4,770,074 A | 9/1988 | Kwech |
| 4,791,842 A | 12/1988 | Olson |
| 4,813,314 A | 3/1989 | Kwech |
| 4,825,543 A | 5/1989 | Thalmann |
| 4,829,860 A | 5/1989 | VanderPol |
| 4,880,340 A | 11/1989 | Taki et al. |
| 4,936,718 A | 6/1990 | Proffitt |
| 4,939,964 A | 7/1990 | Ricci |
| 4,944,205 A | 7/1990 | Ricci |
| 5,002,440 A | 3/1991 | Tamaoki et al. |
| 5,013,015 A | 5/1991 | Fatheree |
| 5,050,291 A | 9/1991 | Gilmore |
| 5,054,342 A | 10/1991 | Swiatowy et al. |
| 5,063,799 A | 11/1991 | Brewer |
| 5,070,600 A | 12/1991 | Brew et al. |
| 5,096,327 A | 3/1992 | Ruland |
| 5,119,703 A | 6/1992 | Ruby |
| 5,199,928 A | 4/1993 | Gress et al. |
| 5,211,212 A | 5/1993 | Carlson |
| 5,361,659 A | 11/1994 | Hanson |
| 5,368,399 A | 11/1994 | Tremblay |
| 5,394,776 A | 3/1995 | Robinson |
| 5,549,024 A | 8/1996 | Ricci |
| 5,557,995 A | 9/1996 | Robinson |
| 5,603,250 A | 2/1997 | Robinson |
| 5,609,081 A | 3/1997 | Lin |
| 5,660,093 A | 8/1997 | Ricci |
| 5,775,188 A | 7/1998 | Strait |
| 5,778,746 A | 7/1998 | Keller |
| 5,894,772 A | 4/1999 | Nodar |
| 5,941,145 A | 8/1999 | Marshall |
| 5,943,927 A | 8/1999 | Hanson |
| 5,954,462 A | 9/1999 | Way et al. |
| 6,038,947 A | 3/2000 | Tremblay |
| 6,050,753 A * | 4/2000 | Turner ............... B25H 1/0064 408/712 |
| 6,065,378 A | 5/2000 | Ricci |
| 6,227,577 B1 | 5/2001 | Ikeda et al. |
| 6,257,110 B1 | 7/2001 | Ricci et al. |
| 6,615,696 B2 | 9/2003 | Ricci |
| 6,688,758 B2 * | 2/2004 | Thibault ............... G01B 11/25 235/454 |
| 6,854,367 B2 | 2/2005 | Ericksson |
| 6,880,832 B2 | 4/2005 | DeRosa |
| 7,000,510 B1 | 2/2006 | Place |
| 7,140,812 B2 | 11/2006 | Bryan |
| 7,267,035 B2 | 9/2007 | Uebelhart |
| 7,337,698 B2 | 3/2008 | DiBiase |
| 7,383,758 B2 | 6/2008 | Place |
| 7,464,478 B2 * | 12/2008 | Adrian ............... B23B 49/00 33/286 |
| 7,510,462 B2 | 3/2009 | Bryan |
| 7,757,591 B2 | 7/2010 | Trice |
| 7,992,473 B2 | 8/2011 | Marple |
| 8,051,753 B2 | 11/2011 | Ricci |
| 8,186,249 B2 | 5/2012 | Sasu |
| 8,250,953 B2 | 8/2012 | Hall |
| 8,261,457 B1 * | 9/2012 | Peters ............... B23B 25/06 33/286 |
| 8,534,170 B2 | 9/2013 | Arnemann |
| 8,667,693 B2 | 3/2014 | Ellis |
| 9,050,669 B2 | 6/2015 | Coakley |
| 2003/0106397 A1 | 6/2003 | Ricci |
| 2004/0035171 A1 | 2/2004 | Gormany |
| 2004/0234352 A1 | 11/2004 | Vanderpol et al. |
| 2005/0132851 A1 | 6/2005 | Place |
| 2005/0155471 A1 | 7/2005 | Ricci |
| 2006/0092674 A1 | 5/2006 | Belton |
| 2006/0207395 A1 | 9/2006 | Place |
| 2007/0289422 A1 | 12/2007 | Place |
| 2010/0101094 A1* | 4/2010 | Schneider ............... B23D 21/04 30/97 |
| 2010/0162860 A1 | 7/2010 | Hall et al. |
| 2011/0041658 A1 | 2/2011 | Weinberg |
| 2011/0083537 A1 | 4/2011 | Place |
| 2011/0219920 A1 | 9/2011 | Arnemann |
| 2013/0239762 A1 | 9/2013 | Place |
| 2014/0096655 A1 | 4/2014 | Coakley |
| 2014/0096662 A1 | 4/2014 | Coakley |
| 2014/0190322 A1 | 7/2014 | Pierce |
| 2014/0190327 A1 | 7/2014 | Pierce |
| 2015/0107425 A1 | 4/2015 | Walton |

FOREIGN PATENT DOCUMENTS

| | | |
|---|---|---|
| CN | 2761329 Y | 3/2006 |
| CN | 201008978 Y | 1/2008 |
| CN | 101384393 A | 3/2009 |
| DE | 900042 C | 12/1953 |
| DE | 2439852 A | 3/1976 |
| DE | 3603618 C1 | 10/1987 |
| DE | 10020393 A1 | 2/2001 |
| DE | 10 2007 013503 A1 | 9/2008 |
| DE | 10 2008 025716 A1 | 12/2009 |
| DE | 10 2009 005983 A1 | 7/2010 |
| EP | 0819501 A1 | 1/1998 |
| FR | 2 641 487 A1 | 7/1990 |
| GB | 2242850 A | 10/1991 |
| NL | 1 038 144 C | 1/2012 |
| WO | 2010077349 A1 | 7/2010 |
| WO | 2012/071419 A1 | 5/2012 |
| WO | 2014055610 A1 | 4/2014 |
| WO | 2014/109910 A1 | 7/2014 |

OTHER PUBLICATIONS

International Search Report and Written Opinion for PCT/US2013/062987 dated Feb. 20, 2014, 11 pages.
International Search Report and Written Opinion for PCT/US2013/063007, dated Jan. 22, 2014, 14 pages.

(56) References Cited

OTHER PUBLICATIONS

International Search Report and Written Opinion for PCT/US2014/058814 dated Dec. 15, 2014, 9 pages.
HST2121, "H&S Tool Clamshell.mpg," Dec. 22, 2009, Published on YouTube, https://www.youtube.com/watch?v=Okfh-ODTj-8.
International Search Report and Written Opinion for International Patent Application No. PCT/US2013/063023 dated Jun. 2, 2014, 16 pages.
International Search Report and Written Opinion for PCT/US2015/056015 dated Mar. 31, 2016, 19 pages.
International Search Report and Written Opinion for PCT/US2015/056006 dated Mar. 31, 2016, 17 pages.
International Search Report and Written Opinion for PCT/US2016/020481 dated Jun. 13, 2016, 13 pages.

\* cited by examiner

LASER LINE GENERATOR TOOL FOR A PIPE MACHINING APPARATUS

This application claims the domestic benefit of U.S. Provisional Application Ser. No. 62/146,640, filed on Apr. 13, 2015, the contents of which are incorporated herein by reference in its entirety.

FIELD OF THE INVENTION

The present disclosure generally relates to pipe machining apparatuses and, more particularly, to pipe machining apparatuses for machining large diameter pipes.

BACKGROUND

A variety of different types of pipe machining apparatuses exist to perform various machining processes on pipes. One such process includes cutting pipes. Large diameter pipes may be cut with a split frame pipe machining apparatus, which includes two frame halves that surround the pipe from respective sides and are coupled together around the pipe. Such a pipe machining apparatus includes a cutting tool that encircles the pipe and moves toward the pipe in small increments during a cutting process in order to slowly cut into the pipe. Eventually, after many small increments of adjustment toward the pipe, the pipe will be completely cut.

SUMMARY

In one aspect, a pipe machining apparatus according to an aspect includes a frame capable of being mounted onto a pipe, a tool carrier coupled to and movable relative to the frame, a tool support coupled to and movable with the tool carrier relative to the frame, and a laser line generator tool mounted on and movable with the tool support. The laser line generator tool is used to image a laser light onto the pipe to align with a mark(s) on the pipe which denotes a proper cut line around the pipe. The apparatus can be repositioned relative to the pipe in order to enable an operator to properly position the apparatus on the pipe prior to a cutting operation.

The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

Figure 1:
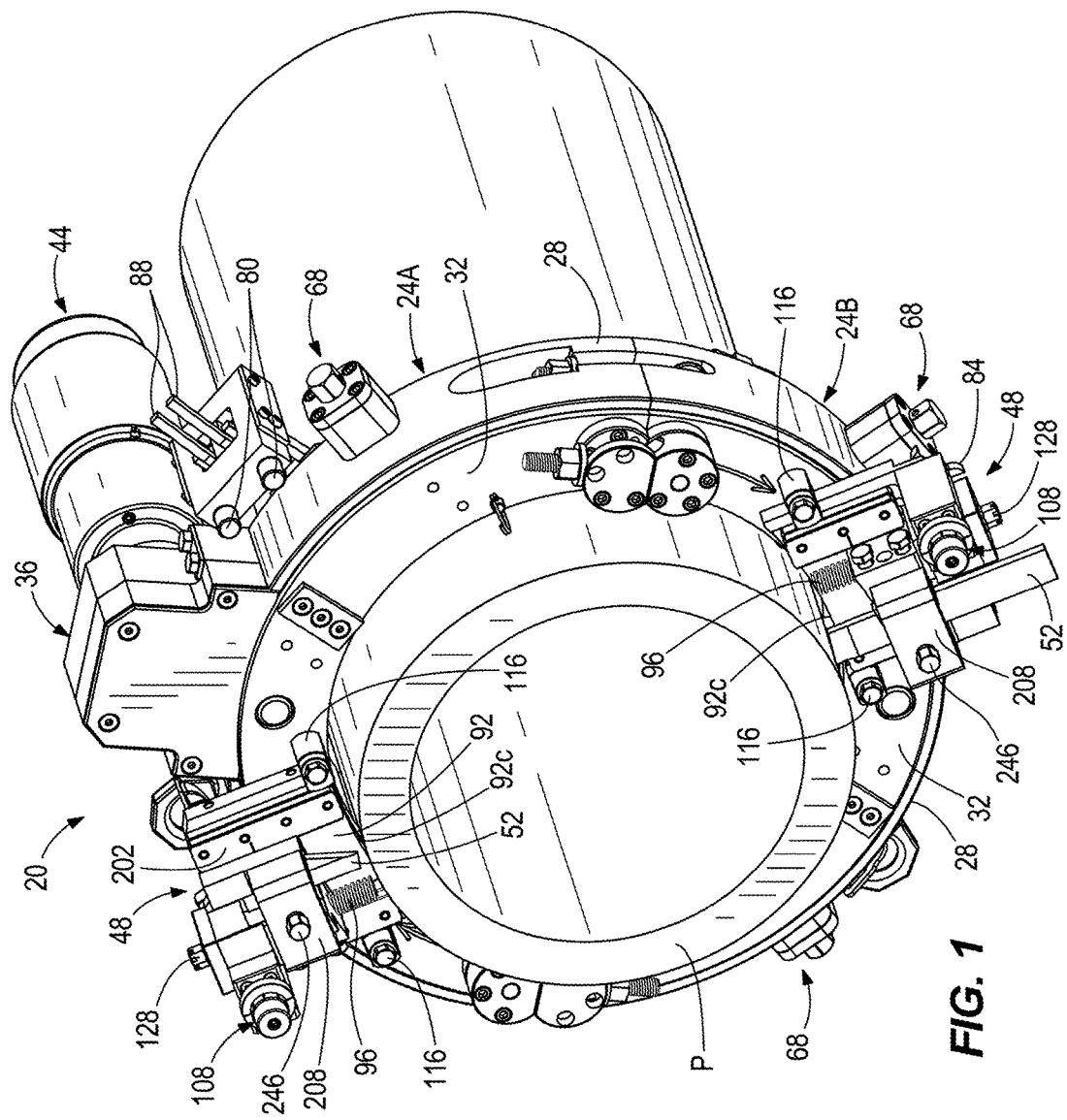
FIG. 1 depicts a top front perspective view of an exemplary pipe machining apparatus coupled to a pipe having a laser line generator tool mounted thereon.
Figure 2:
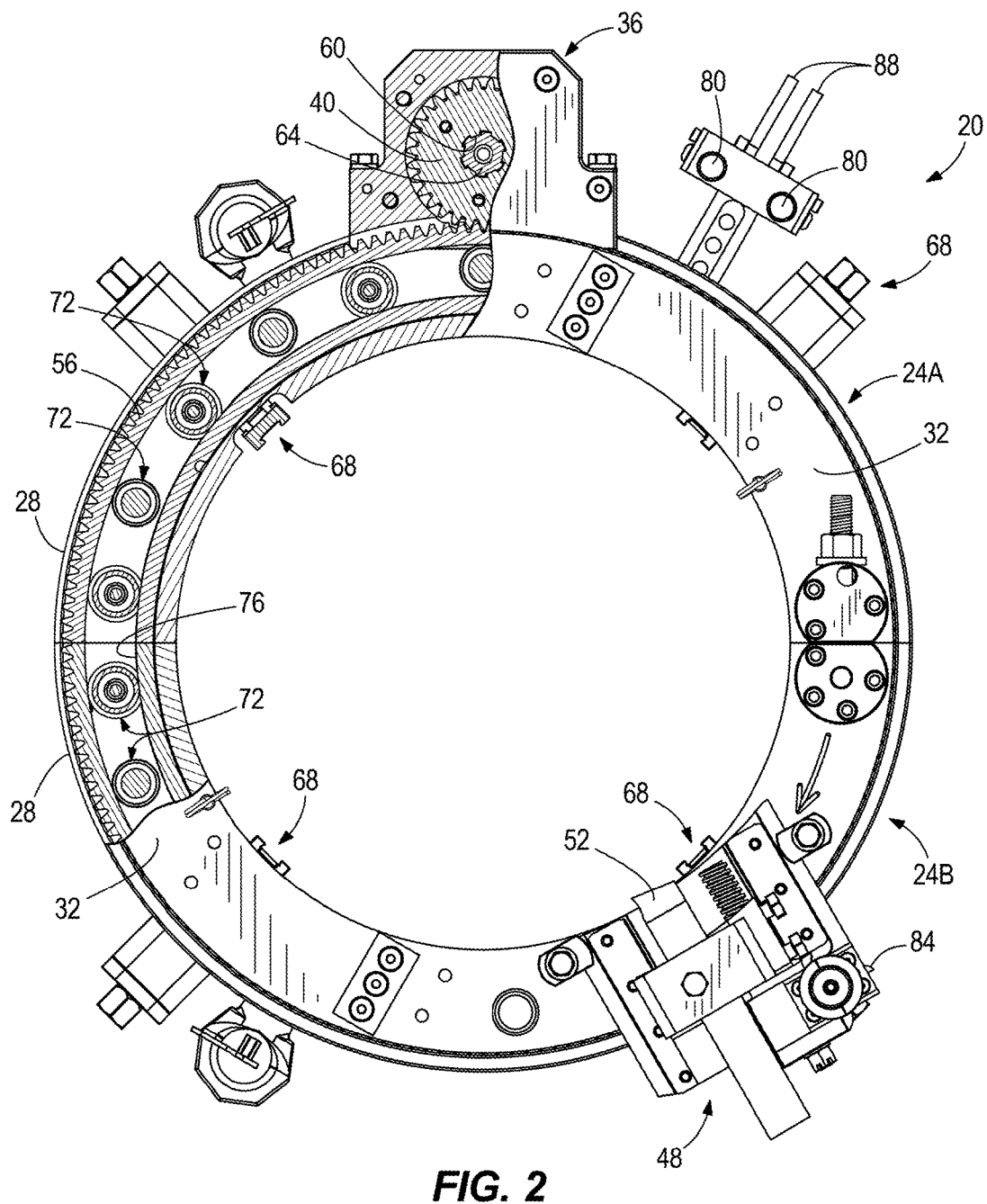
FIG. 2 depicts a front view of the pipe machining apparatus, with a portion thereof broken away to show internal components of the pipe machining apparatus.
Figure 3:
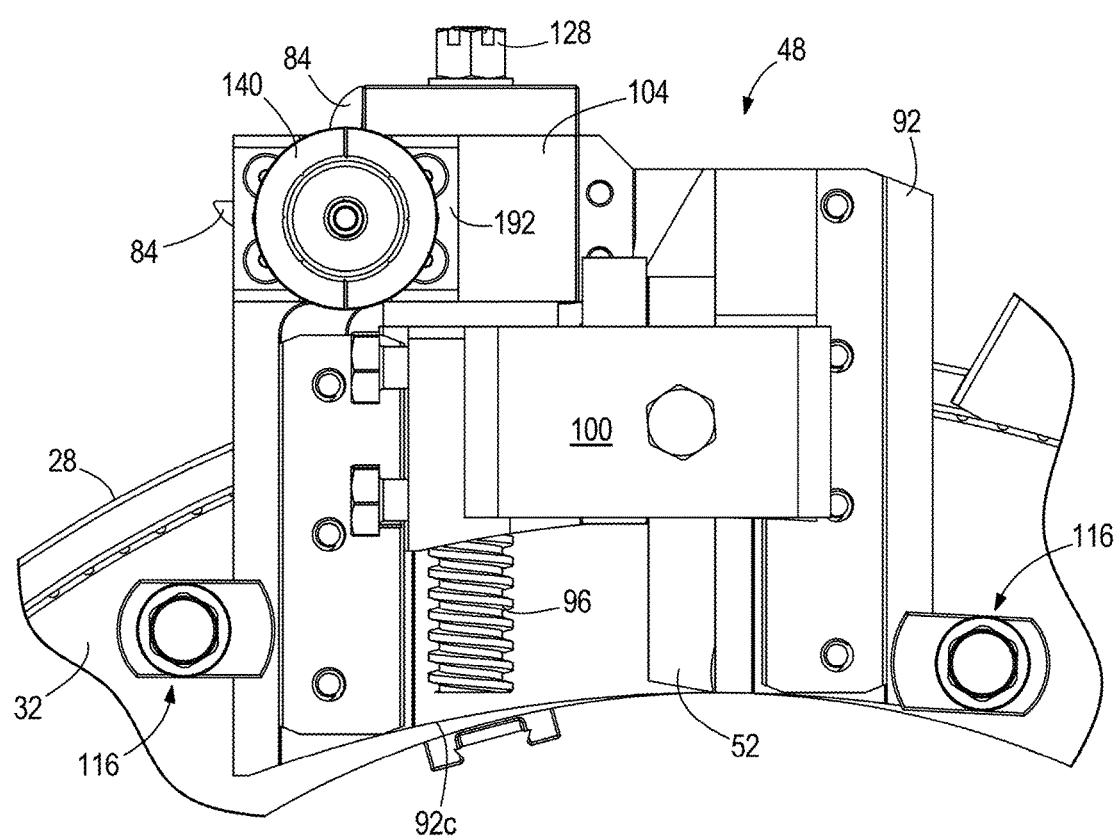
FIG. 3 depicts a front view of an exemplary tool support of the pipe machining apparatus, with the tool support illustrated in an engaged position.

With reference to FIGS. 1 and 2, there is shown one exemplary embodiment of a pipe machining apparatus 20 adapted to machine pipes P of varying diameters. In some exemplary embodiments, the apparatus 20 completely cuts through the pipe P. In other exemplary embodiments, the apparatus 20 prepares an end of a pipe P for coupling to another pipe. In still other exemplary embodiments, the apparatus 20 both completely cuts and prepares a pipe P for coupling to another pipe.

In the illustrated exemplary embodiment, the apparatus 20 is formed of two joined-together semicircular sections 24A, 24B and includes a frame 28 and a tool carrier 32. The two sections 24A, 24B together comprise the frame 28 and the tool carrier 32 such that a first portion of the frame 28 and a first portion of the tool carrier 32 is included in one section 24A and a second portion of the frame 28 and a second portion of the tool carrier 32 is included in the other section 24B. The frame 28 has a column 36 extending outwardly of the two semicircular sections 24A, 24B and houses a pinion gear 40 adapted to couple with a suitable drive motor 44, such as an air motor with suitable gear reduction means. The frame 28 is adapted to couple and be fixed relative to a pipe P, and the tool carrier 32 is rotatable relative to the fixed frame 28 and the pipe P. The motor 44 is adapted to rotate the tool carrier 32 relative to the frame 28 through a gear train in the column 36. The tool carrier 32 has a circular gear rack 56 for meshing with the pinion gear 40 rotatably mounted in column 36. The pinion gear 40 has an opening 60 provided with a polygonal perimeter for receiving a complementary shaped drive head 64 of drive motor 44. Therefore, it can be seen that drive motor 44 is adapted to rotate tool carrier 32 relative to the frame 28 through a gear train provided by pinion gear 40 in column 36 and circular gear rack 56 on the tool carrier 32.

The rotatable tool carrier 32 includes one or more tool supports 48 (two tool supports shown in the illustrated exemplary embodiment). One of the tool supports 48 is used to initially support a laser line generator tool 300 for allowing an operator cutting the pipe to properly place the pipe machining apparatus 20 on the pipe P. Once the apparatus 20 is properly placed on the pipe P, the operator removes the laser line generator tool 300. Thereafter, the operator inserts cutting or machining tools 52 into the tool supports 48 for performing a cutting or machining operation on the pipe P as the tools 52 rotate circumferentially about the pipe P in a known manner. The machining operation performed by the cutting or machining tool(s) 52 may form a straight edge perpendicular to a longitudinal extent of the pipe P, a bevel on an end of the pipe P that is transverse to the longitudinal extend of the pipe P and at an angle other than ninety degrees, or an edge of a pipe P having any angle.

The tool carrier 32 is rotatably mounted on and supported by frame 28 by a plurality of roller bearings 72. The roller bearings 72 ride in a circular bearing race 76 on the interior of tool carrier 32.

A plurality of projections 80 are adjustably movable into and out of a path of an advancement member 84 coupled to each tool support 48 to advance the cutting or machining tool 52 toward the pipe P. In the illustrated exemplary embodiment, the apparatus 20 includes a total of two projections 80 for engaging the advancement members 84, however, the apparatus 20 may include any number of projections 80. Each projection 80 is coupled to a lever 88 that may be actuated by a user to selectively move the projection 80 into and out of the path of the advancement members 84.

The apparatus 20 further includes four adjustable clamp members or coupling members 68 engageable with an exterior of the pipe P and having suitable adjustability to couple and concentrically locate the apparatus 20 to the pipe P when the laser line generator tool 300 is being used as described herein.

Figure 4:
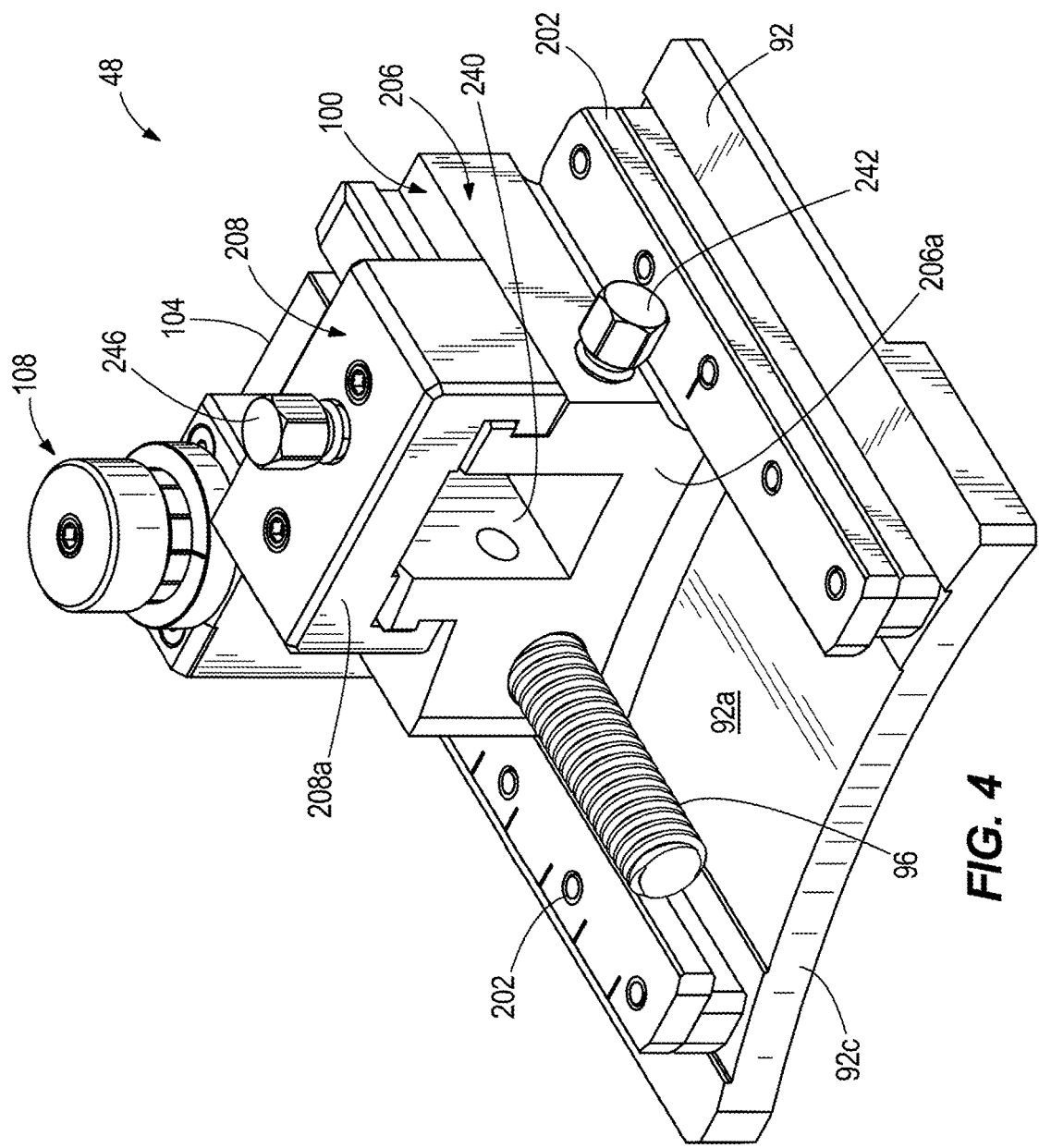
FIG. 4 depicts a top front perspective view of the tool support of FIG. 3.
Figure 5:
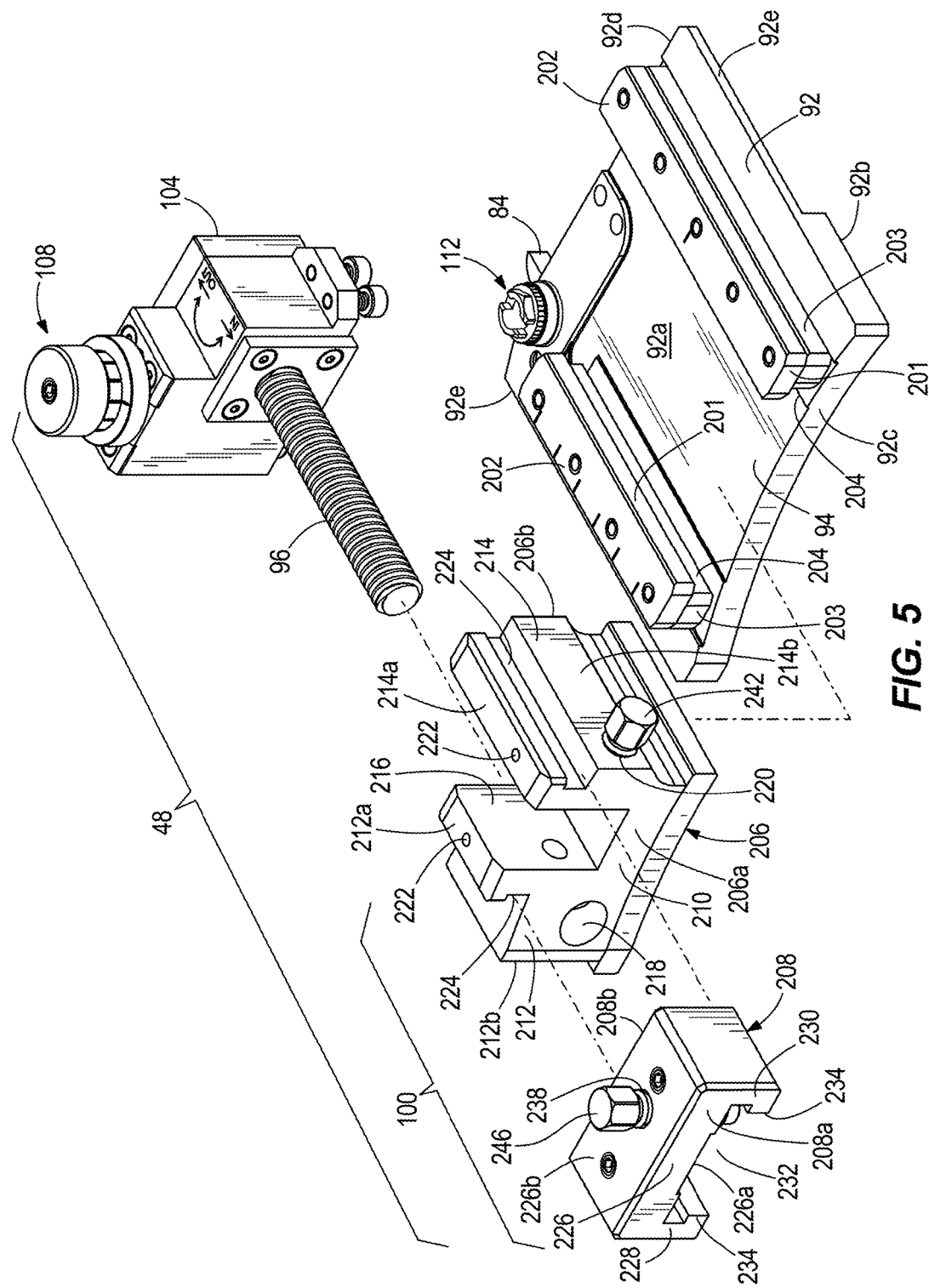
FIG. 5 depicts an exploded top front perspective view of the tool support of FIG. 3.
Figure 6:
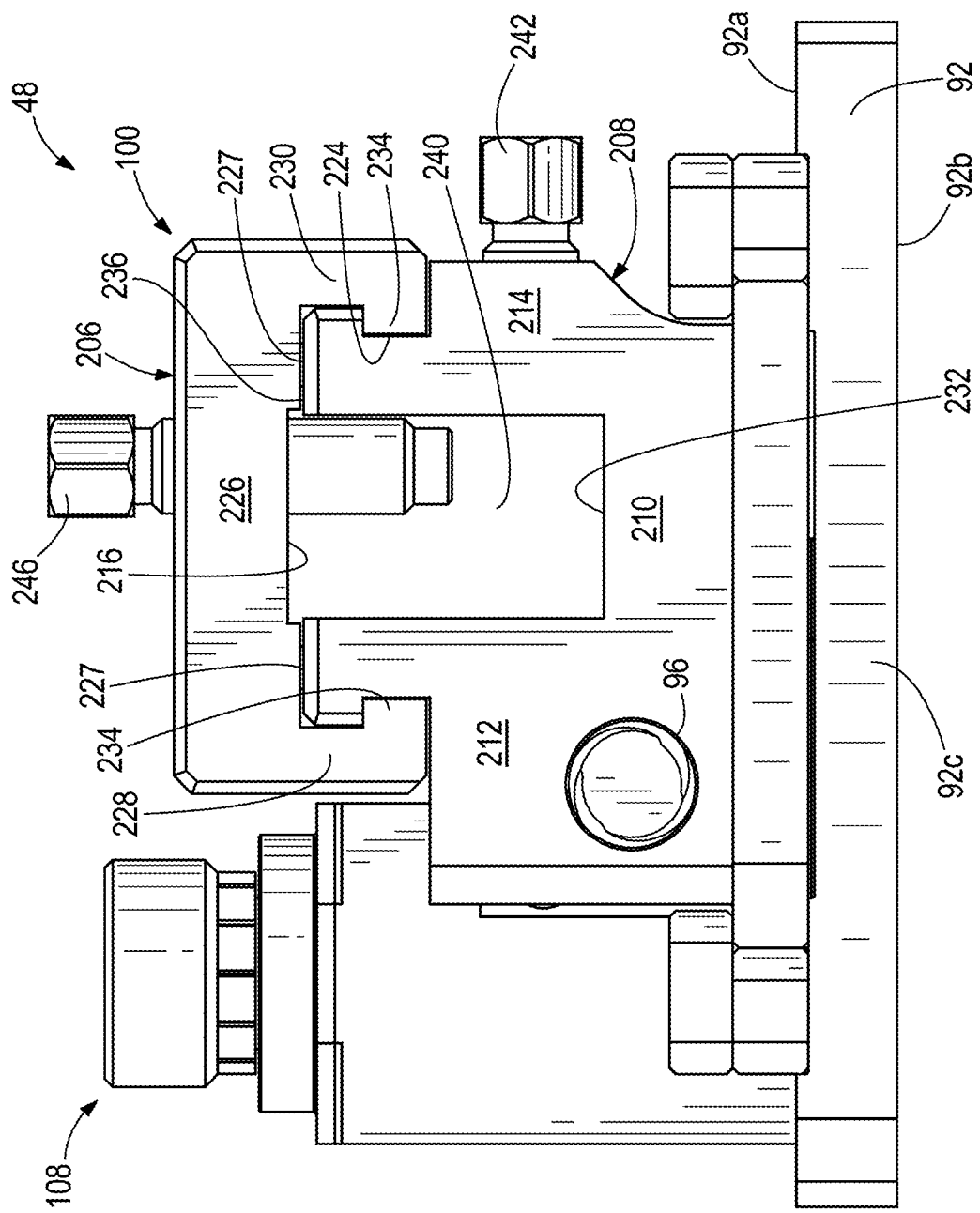
FIG. 6 depicts a front plan view of the tool support of FIG. 3.
Figure 7:
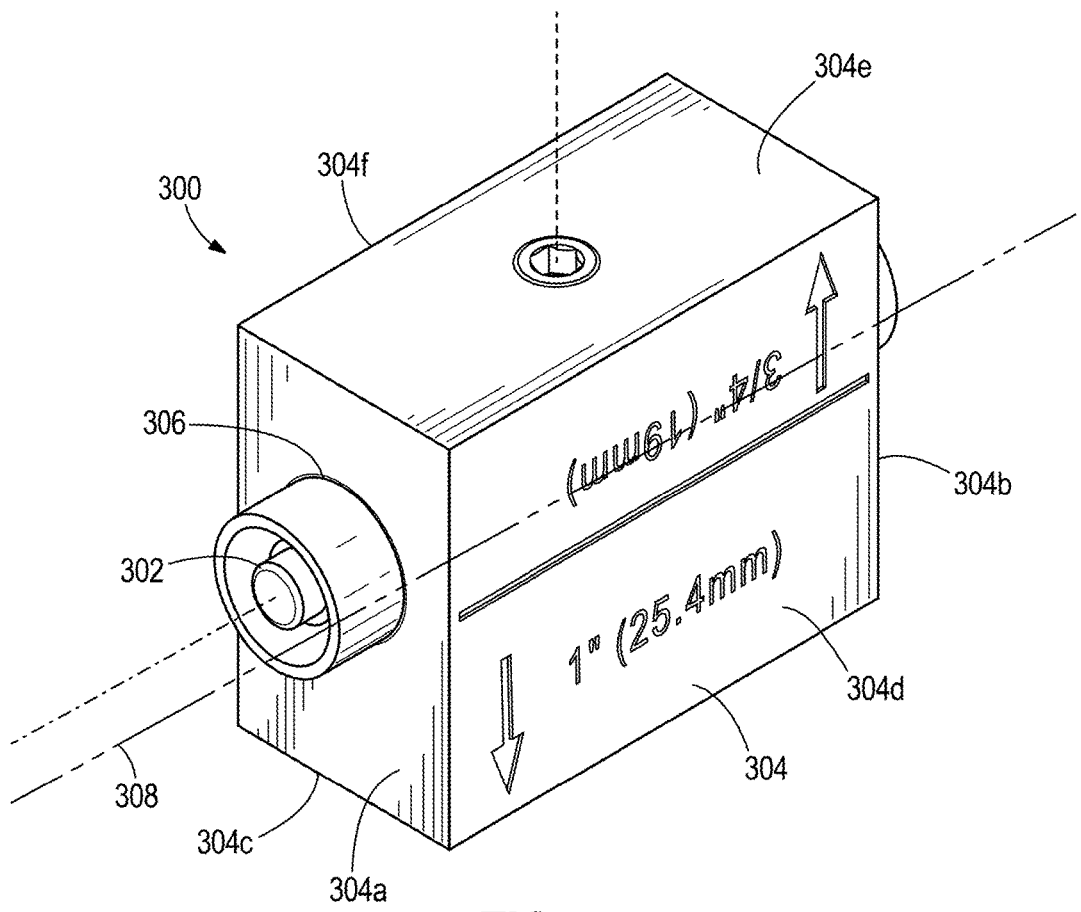
FIG. 7 depicts a top front perspective view of the laser line generator tool.

FIGS. 4-6 illustrate the tool support 48 of the tool carrier 32 in more detail. The tool support 48 includes a base 92, a worm gear assembly 108 fixedly coupled to the base 92, a drive coupling 112 engageable with the worm gear assembly 108, a feed screw 96 rotatably coupled to the worm gear assembly 108, and a tool clamp 100 movably mounted on the feed screw 96 and slidable on the base 92. The tool clamp 100 is adapted to support the laser line generator tool 300 or the cutting or machining tool 52. The advancement member 84 is coupled to the drive coupling 112.

The base 92 has a first planar surface 92a, a second opposite surface 92b, inner and outer edges 92c, 92d extending between the first and second surfaces 92a, 92b, and side edges 92e extending between the first and second surfaces 92a, 92b. The inner edge 92c is arcuate to match the shape of the pipe P. A pair of spaced apart guide rails 202 extend outwardly from the first surface 92a and extend from the inner edge 92c to the outer edge 92d. A passageway 94 is defined between the rails 202. Each guide rail 202 is L-shaped having a first leg 201 and a second leg 203 which is perpendicular to the first leg 201, such that a recess 204 is formed by each guide rail 202. The recesses 204 extend along the length of the base 92 from the inner edge 92c to the outer edge 92d. The recesses 204 face each other and communicate with the passageway 94.

The tool clamp 100 is formed of an inner housing 206 and an outer housing 208. The inner housing 206 seats within the passageway 94 on the first surface 92a of the base 92 and engages with the rails 202. The outer housing 208 mates with the inner housing 206.

The inner housing 206 is generally U-shaped and has a base wall 210, a first wall 212 extending outwardly from the base wall 210, and a second wall 214 extending outwardly from the base wall 210. The first and second walls 212, 214 are spaced apart from each other such that a passageway 216 is defined by the base wall 210 and the first and second walls 212, 214, which passageway 216 extends from an inner end 206a of the inner housing 206 to an outer end 206b of the inner housing 206. The first wall 212 has a threaded passageway 218 extending therethrough, which threaded passageway 218 extends parallel to the passageway 216. The second wall 214 has a threaded passageway 220 extending therethrough, which threaded passageway 220 extends transverse, or substantially transverse, to the passageways 216, 218. Each wall 212, 214 has a recess 222 on its outer free end 212a, 214a. Each wall 212, 214 further has a recess 224 which forms a keyway on its outer surface 212b, 214b and which is proximate to its outer end 212a, 214a for accepting the outer housing 208.

The outer housing 208 is generally U-shaped and has a base wall 226, a first wall 228 extending inwardly from the base wall 226, and a second wall 228 extending inwardly from the base wall 226. The first and second walls 228, 230 are spaced apart from each other such that a passageway 232 is defined by the base wall 226 and the first and second walls 228, 230, which passageway 232 extends from an inner end 208a of the outer housing 208 to an outer end 208b of the outer housing 208. The base wall 226 has a pair of protrusions 227 extending from the inner surface 226a and extending into the passageway 232. Each of the first and second walls 228, 230 have a key 234 on its inner surface and for sliding along the recesses 224 of the inner housing 206. The keys 234 are smaller than the recesses 224 such that spaces 236 are provided when the outer housing 208 is assembled with the inner housing 206. The base wall 226 has a threaded passageway 238 extending therethrough, which threaded passageway 238 extends transverse, or substantially transverse, to the passageway 232, such that the threaded passageway 238 extends from an outer side 226b to the inner side 226a of the base wall 226.

The worm gear assembly 108 seats on the first surface 92a of the base 92 and engages with the drive coupling 112. The feed screw 96 extends inwardly toward inner edge 92c. The inner housing 206 seats on the first surface 92a of the base 92 between the guide rails 202. Edge portions of the base 210 of the inner housing 206 engage into the recesses 204. The feed screw 96 threadedly engages with the passageway 218 in the inner housing 206 to mate the inner housing 206 with the worm gear assembly 108. The outer housing 208 mates with the inner housing 206 by the keys 234 sliding into and along the recesses 224. The protrusions 227 engage within the recesses 222 to prevent the separation of the inner housing 206 from the outer housing 208 once assembled. The protrusions 227 may be provided on the walls 212, 214 and the recesses 222 provided on the base wall 226. The passageways 216, 232 align with each other to form a cavity 240.

A set screw 242 is inserted through the passageway 220 in the inner housing 206 and is capable of extending into the cavity 240 upon rotation of the set screw 242. A set screw 246 is inserted through the passageway 238 in the outer housing 208 and is capable of extending into the cavity 240 upon rotation of the set screw 246.

The tool support 48 is coupled to the tool carrier 32 by one or more coupling members 116 (two shown in the exemplary illustrated embodiment) and is adjustable relative to the pipe P to bring the arcuate inner edge 92c of the base 92 into contact with or in close proximity to an outer periphery of the pipe P. The tool clamp 100 is movable along the feed screw 96 toward and away from the pipe P (depending on the direction of feed screw rotation). The feed screw 96 can have a variety of different tooth shapes, sizes, pitches, and configurations in order to provide a desired amount of movement of the cutting or machining tool 52 during use of the apparatus 20. The drive coupling 112 is coupled to the feed screw 96 and is engageable with the worm gear assembly 108 to transfer rotation of the worm gear assembly 108 to the feed screw 96. A tool coupling 128 such as, for example, a nut, is coupled to an end of the feed screw 96, thereby providing a location where a tool may couple to and rotate the feed screw 96 as desired.

Cutting or machining tools 52 are known in the art.

The laser line generator tool 300 includes a laser line generator 302 and a housing 304. Laser line generators 302 are known in the art. The housing 304 may conform in shape to the cavity 240. As shown, the housing 304 includes an inner wall 304a, an outer wall 304b and side walls 304c, 304d, 304e, 304f extending between the inner and outer walls 304a, 304b. A passageway 306 extends through the housing 304 from the inner wall 304a to the outer wall 304b and defines a centerline. The laser line generator 302 mounts within the passageway 306 such that the light emitted from the laser line generator 302 is projected outwardly from the inner wall 304a. As such, the centerline of the laser line generator 302 aligns with the centerline of the passageway 306. The housing 304 has a centerline 308 which extends through the housing 304 from the inner wall 304a to the outer wall 304b. The passageway 306 is offset from the centerline 308 such that the laser light generated by the laser line generator 302 can be used for 1" tooling and for ¾" tooling. Thus, the laser line generator 302 is offset ¼" from the centerline 308.

In use, the operator provides marks, such as three marks, on the outer diameter and spaced apart around the circumference of the pipe P which indicates where the cutting is to be performed by the cutting or machining tools 52.

The pipe machining apparatus 20 is mounted on the pipe P and the clamp members or coupling members 68 are engaged with the exterior of the pipe P in an attempt to properly locate the apparatus 20. Prior to insertion of the cutting or machining tool 52 into the cavity 240, the laser line generator tool 300 is inserted into the cavity 240 such that the inner side 304c is proximate to the inner ends 206a, 208a of the inner and outer housings 206, 208. The set screw 242 is engaged with the side wall 304d of the housing 304 of the laser line generator tool 300 to secure the laser line generator tool 300 to the tool support 48. The laser line generator tool 300 is activated to cause a line to be imaged on the outer diameter of the pipe P. The line is parallel to the end of the pipe P and aligns with a first mark made by the operator. The apparatus 20 is then rotated in a known manner to rotate the tool support 48 and laser line generator tool 300 around the outer diameter of the pipe P. If the apparatus 20 is properly positioned on the pipe P, the line imaged by the laser line generator tool 300 will overlay each mark. If the line imaged by the laser line generator tool 300 does not overlay one or more of the marks, then the operator knows that the position of the apparatus 20 needs to be adjusted. Desired ones of clamp members or coupling members 68 are adjusted to change the position of the apparatus relative to the pipe P. After adjustment, the apparatus 20 is again rotated to determine if the line imaged by the laser line generator tool 300 overlays each mark. This process is repeated until the proper positioning of the apparatus 20 relative to the pipe P is achieved. The laser line generator tool 300 can be positioned in the cavity 240 such that the centerline of the laser line generator 302 is closer or further away from the end of the pipe P, depending upon the orientation of the laser line generator tool 300 since the centerline of the laser line generator 302 is offset.

Once the proper position of the apparatus 20 relative to the pipe P is achieved, the set screw 242 is rotated to disengage from the housing 304 of the laser line generator tool 300 and the laser line generator tool 300 is slid out of the cavity 240. The cutting or machining tool 52 is then inserted into the cavity 240 and secured by engaging set screws 242, 246 with the cutting or machining tool 52.

During operation of the apparatus 20, the motor 44 rotates the pinion gear 40, which, through engagement with the gear rack 56, causes the tool carrier 32 to rotate relative to the frame 28 and the pipe P. During tool carrier rotation, the advancement member 84 contacts the advancement projections 80 and rotates as a result, thereby rotating the worm gear assembly 108. Rotation of the feed screw 96 moves the tool clamp 100 and cutting or machining tool 52 toward the pipe P to perform deeper machining into the pipe P. The cutting or machining tool 52 advances until the pipe P is machined to a desired extent (e.g., until the pipe is completely cut or parted). After the desired amount of machining is achieved, it may be desirable to retract the cutting or machining tool 52 along the tool support 48 from the advanced cutting position. This can be performed in a conventional manner.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A pipe machining apparatus comprising:
   a frame capable of being mounted around a pipe;
   a tool carrier coupled to and movable relative to the frame such that the tool carrier is rotatable around an outer diameter of the pipe;
   a tool support coupled to and movable with the tool carrier relative to the frame, the tool support having a passageway therethrough;
   a laser line generator tool capable of being mounted in the passageway of the tool support and capable of being removed from the passageway of the tool support, the laser line generator tool being movable with the tool support when mounted thereon, the laser line generator tool imaging a laser light onto the pipe as the tool carrier is rotated around the pipe; and
   a cutting or machining tool capable of being mounted in the passageway of the tool support when the laser line generator tool is not mounted in the passageway such that the laser line generator tool and the cutting or machining tool are interchangeably mounted within the passageway, the cutting or machining tool capable of being removed from the passageway of the tool support, the cutting or machining tool being movable with the tool support when mounted thereon, the cutting or machining tool cutting or machining the pipe as the tool carrier is rotated around the pipe when mounted on the tool support.

2. The pipe machining apparatus of claim 1, wherein the laser line generator tool comprises a housing that defines a centerline and a laser line generator that defines a centerline, the centerline of the laser line generator being offset from the centerline of the housing.

3. The pipe machining apparatus of claim 2, wherein the laser line generator tool is offset ¼" from the centerline of the housing.

4. The pipe machining apparatus of claim 1, wherein the laser line generator tool is fixed to the tool support by a set screw.

5. The pipe machining apparatus of claim 1, wherein the tool support comprises an inner housing and outer housing which can be detached from each other, the inner and outer housings forming the passageway.

6. The pipe machining apparatus of claim 1, further comprising adjustable members attached to the frame and configured to be engaged with the pipe, the adjustable members being used to adjust the position of the frame relative to an exterior surface of the pipe.

7. The pipe machining apparatus of claim 1 in combination with a pipe, the pipe having marks on an exterior surface thereof, the laser line generator tool being configured to image laser light onto the marks as the tool carrier is rotated around the pipe.

\* \* \* \* \*